(12) United States Patent
Seo et al.

(10) Patent No.: US 9,952,570 B2
(45) Date of Patent: Apr. 24, 2018

(54) ELECTRIC POWER MANAGEMENT

(71) Applicant: KT CORPORATION, Gyeonggi-do (KR)

(72) Inventors: Ho-Seok Seo, Daejeon (KR); Ki-Jung Kim, Gangwon-do (KR); Ji-Hyun An, Seoul (KR); Jong-Hoon Han, Gyeonggi-do (KR); Jung-Guen Kim, Daejeon (KR); Ja-Kyung Hahn, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 602 days.

(21) Appl. No.: 14/538,037

(22) Filed: Nov. 11, 2014

(65) Prior Publication Data

US 2015/0134138 A1     May 14, 2015

(30) Foreign Application Priority Data

Nov. 11, 2013   (KR) ........................ 10-2013-0136480

(51) Int. Cl.
*G05B 15/02*     (2006.01)
*G01D 4/00*     (2006.01)
(Continued)

(52) U.S. Cl.
CPC ............. *G05B 15/02* (2013.01); *G01D 4/002* (2013.01); *H02J 3/005* (2013.01);
(Continued)

(58) Field of Classification Search
CPC ......... G05B 15/02; G01D 4/002; H02J 3/005; H02J 13/0079; Y02B 90/244
See application file for complete search history.

(56) References Cited

U.S. PATENT DOCUMENTS

2010/0082174 A1*   4/2010   Weaver ................ H02J 3/14
                                                              700/295
2011/0060495 A1*   3/2011   Kono ................. B60W 40/072
                                                               701/31.4
(Continued)

FOREIGN PATENT DOCUMENTS

KR   10-2009-0032486 A    4/2009
KR   10-2011-0070654 A    6/2011
(Continued)

*Primary Examiner* — Charles E Anya
(74) *Attorney, Agent, or Firm* — IP Legal Services, LLC

(57) ABSTRACT

The disclosure is related to a method for controlling an electric power consumption amount of a consumer by a server coupled to a smart grid for managing electric power distribution. The method may include receiving signals having information on electric power consumption amounts from a meter of a consumer through a communication network, determining an electric power consumption pattern of the consumer based on the information on electric power consumption amounts, calculating electric power supply amounts for a predetermined time period based on the determined electric power consumption pattern of the consumer, and transmitting a control signal to the meter of the consumer through a communication network for controlling an electric power consumption amount of the consumer based on the calculated electric power supply amounts.

14 Claims, 5 Drawing Sheets

(51) Int. Cl.
*H02J 3/00* (2006.01)
*H02J 13/00* (2006.01)

(52) U.S. Cl.
CPC ..... *H02J 13/0079* (2013.01); *H02J 2003/007* (2013.01); *Y02B 90/241* (2013.01); *Y02B 90/244* (2013.01); *Y02B 90/245* (2013.01); *Y02E 60/76* (2013.01); *Y04S 20/32* (2013.01); *Y04S 20/327* (2013.01); *Y04S 20/38* (2013.01); *Y04S 20/40* (2013.01); *Y04S 40/22* (2013.01)

(56) References Cited

U.S. PATENT DOCUMENTS

| | | |
|---|---|---|
| 2011/0153107 A1 | 6/2011 | Kim et al. |
| 2012/0136638 A1* | 5/2012 | Deschamps ............ G01D 4/002 703/2 |
| 2012/0166004 A1 | 6/2012 | Park et al. |
| 2012/0166008 A1* | 6/2012 | Jeong ................... H02J 3/14 700/295 |
| 2012/0245752 A1* | 9/2012 | Borrett .................. G06Q 10/06 700/295 |
| 2012/0286723 A1* | 11/2012 | Ukita ............... G06Q 10/06312 320/107 |
| 2013/0082641 A1* | 4/2013 | Nishibayashi ............ H02J 3/32 320/106 |
| 2013/0103967 A1* | 4/2013 | Conroy .................... G06F 1/26 713/340 |
| 2013/0131880 A1 | 5/2013 | Lee |
| 2013/0304550 A1* | 11/2013 | Hayashi ................. H02J 3/008 705/14.1 |
| 2014/0039709 A1* | 2/2014 | Steven .................. G06Q 10/06 700/291 |

FOREIGN PATENT DOCUMENTS

| | | |
|---|---|---|
| KR | 10-2012-0072016 A | 7/2012 |
| KR | 10-2013-0055409 A | 5/2013 |
| KR | 10-1271166 B1 | 6/2013 |

* cited by examiner

ELECTRIC POWER MANAGEMENT

CROSS REFERENCE TO PRIOR APPLICATIONS

The present application claims priority under 35 U.S.C. § 119 to Korean Patent Application No. 10-2013-0136480 (filed on Nov. 11, 2013).

BACKGROUND

The present disclosure relates to managing electric power consumption. Smart grid has been introduced for improving efficiency and convenience in managing electric power supply and consumption. Such smart grid may be an automated and distributed advanced energy delivery network. For example, smart grid may enable monitoring and measuring electric power consumption amounts of consumers in real time. Such monitoring information might be used to forecast an electric power consumption amount of a consumer and manage an electric power supply amount of the consumer based on the forecasted electric power consumption amount.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, electric power consumption of a consumer may be adaptably and dynamically controlled based on an electric power consumption pattern of the consumer.

In accordance with another aspect of the present embodiment, an electric power supply amount of each consumer may be individually and adaptably controlled based on an electric power consumption pattern of each consumer.

In accordance with at least one embodiment, a method may be provided for controlling an electric power consumption amount of a consumer by a server coupled to a smart grid for managing electric power distribution. The method may include receiving signals having information on electric power consumption amounts from a meter of a consumer through a communication network, determining an electric power consumption pattern of the consumer based on the information on electric power consumption amounts, calculating electric power supply amounts for a predetermined time period based on the determined electric power consumption pattern of the consumer, and transmitting a control signal to the meter of the consumer through a communication network for controlling an electric power consumption amount of the consumer based on the calculated electric power supply amounts.

The calculating electric power supply amounts may include calculating current values for the predetermined time period based on the calculated electric power supply amounts and generating the control signal including information on the calculated current values.

The method may further include controlling, by the meter of the consumer, an electric power consumption amount at a predetermined time unit based on at least one of the calculated current values, mapped to the predetermined time unit.

The receiving signals having information on electric power consumption amount from a meter of a consumer may include measuring, by the meter of the consumer, an electric power consumption amount at a regular interval, generating, by the meter of the consumer, a signal having information on the measured electric power consumption amount, and transmitting, by the meter of the consumer, the generated signal to the server.

The receiving signals may include extracting an electric power consumption amount at a predetermined time from the received signals and storing the extracted electric power consumption amount in a memory of the server in connection with identification information of the consumer.

The calculating electric power supply amount may include determining an electric power supply level based on an overall electric power supply state and selecting one of predetermined electric power supply coefficients, mapped to the determined electric power supply level.

The determining an electric power supply level may include receiving signals from at least one of electric power generation stations, meters of consumers, and transmission towers, measuring an overall electric power supply amount and an overall electric power consumption amount based on the information included in the received signals, comparing the measured overall electric power supply amount and the measured overall electric power consumption amount, and determining the electric power supply level based on the comparison result.

The calculating electric power supply amounts may include multiplying the electric power consumption pattern of the consumer with the selected electric power supply coefficient and determining the multiplying result as the electric power supply amounts for the consumer.

The calculating electric power supply amount may include receiving a signal having information on a desired electric power consumption level from user equipment of the consumer and determining an electric power consumption coefficient mapped to the desired electric power consumption level.

The receiving a signal having information on an electric power consumption level may include providing a user interface to the user equipment for enabling the consumer to enter the desired electric power consumption level.

The calculating electric power supply amounts may include multiplying the electric power consumption pattern of the consumer with the selected electric power consumption coefficient and determining the multiplying result as the electric power supply amounts for the consumer.

The determining an electric power consumption pattern of the consumer may include calculating an average electric power consumption amount at each unit time based on the information on electric power consumption amounts included in the received signals and generating the electric power consumption pattern by combining the calculated average electric power consumption amount at each unit time. The electric power consumption pattern may be a customer baseline load.

In accordance with another embodiment, a server, coupled to a smart grid, may be provided for controlling an electric power consumption amount of a consumer. The server may comprise a communication circuit, a processor, and a memory. The communication circuit configured to receive signals having information on electric power consumption amounts from a meter of a consumer through a communication network and to transmit a control signal to the meter of the consumer through a communication network for controlling an electric power consumption amount of the consumer. The processor is configured to determine an electric power consumption pattern of the consumer based on the information on electric power consumption amounts and to calculate electric power supply amounts for a predetermined time period based on the determined electric power consumption pattern of the consumer,

BRIEF DESCRIPTION OF THE DRAWINGS

The above and/or other aspects of some embodiments of the present invention will become apparent and more readily appreciated from the following description of embodiments, taken in conjunction with the accompanying drawings, of which.

DETAILED DESCRIPTION OF EMBODIMENTS

Figure 1:
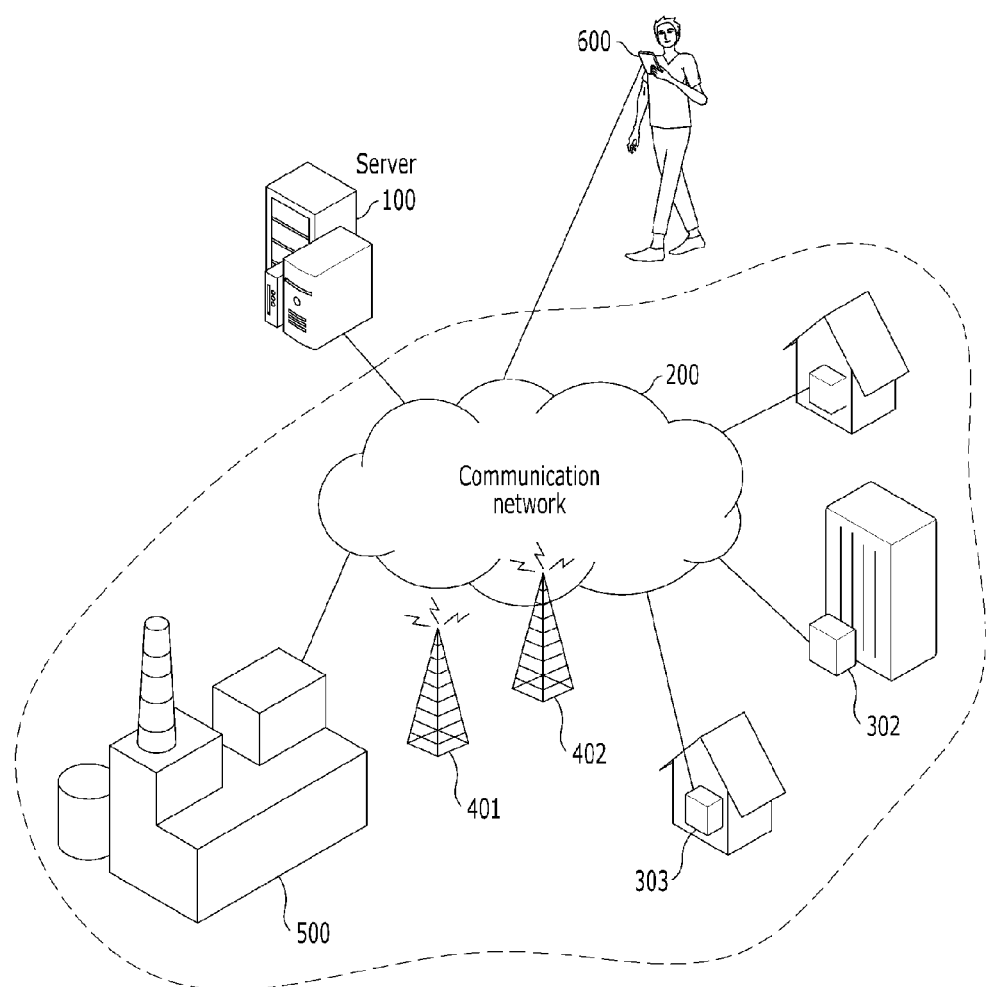
FIG. 1 illustrates an overall view of individually, dynamically, and adaptably managing an electric power of each consumer in accordance with at least one embodiment.

Reference will now be made in detail to exemplary embodiments of the present invention, examples of which are illustrated in the accompanying drawings, wherein like reference numerals refer to like elements throughout. The embodiments are described below, in order to explain embodiments of the present invention by referring to the figures.

In accordance with at least one embodiment, an electric power consumption amount and/or an electric power supply amount of each consumer may be individually, adaptably, and dynamically controlled and managed based on an electric power consumption pattern of a corresponding consumer. In particular, an electric power consumption pattern of each consumer may be determined, an electric power supply amount of each consumer may be decided based on the electric power consuming pattern of a corresponding consumer, and a current value of the corresponding consumer may be calculated based on the electric power supply amount based on the determined electric power supply amount. Using such a current value, an electric power consuming amount and/or an electric power supply amount of each consumer may be controlled. Such operation for electric power management will be described with reference to FIG. 1.

FIG. 1 illustrates an overall view of individually, dynamically, and adaptably managing an electric power of each consumer in accordance with at least one embodiment.

Referring to FIG. 1, electric power may be controlled and managed through server 100 coupled to a smart grid in accordance with at least one embodiment. Such a smart grade is a modernized interconnected network for delivering electricity from suppliers to consumers. The smart grid may be an electric grid that employs digital information and communications technology to collect and manage information about behaviors of suppliers and consumers in an automated fashion to improve the efficiency, reliability, economics, and sustainability of the production and distribution of electricity. The smart grid may be a meter data management system (MDMS).

In accordance with at least one embodiment, server 100 may collect data from meters of consumers coupled to a smart grid and determine an electric power consumption pattern of each consumer based on the electric power consumption, and dynamically and adaptably control an electric power supply amount of a corresponding consumer based on the determined electric power consumption pattern in real time. For example, server 100 may be coupled to communication network 200 and to meters 301 to 303 of consumers through communication network 200. In addition, server 100 may be coupled to power generation station 500 and transmission towers 401 and 402 and collect information about electric power generation and supply. The consumer may be a house or a building that consumes electric power generated by power generation station 500 and transmitted through transmission towers 401 and 402.

Meters 301 to 303 may be a device installed at a consumer (e.g., house or building) for measuring an electric power consumption amount consumed by a corresponding consumer. Meters 301 to 303 may control an electric power supply amount supplied to a consumer in accordance with at least one embodiment. For example, meters 301 to 303 may receive a control signal from server 100 and extract information on a current value for controlling the electric power supply amount. Meters 301 to 303 may control the electric power supply amount based on the extracted current value.

User equipment 600 may be a personal device including a processor, a memory, and a communication circuit, which is capable of processing a predetermined operation related to controlling electric power consumption and to communicating with server 100 through communication network 200 or a smart grid. For example, user equipment 600 may include a smart phone, a pad-like device, a personal computer (PC), a laptop computer, a tablet PC, a personal digital assistance (PDA), and so forth.

In accordance with at least one embodiment, user equipment 600 may access a web-site published on Internet by server 200 and enable a consumer to control an electric power consumption amount. Furthermore, user equipment 600 may download an application from server 200, install the downloaded application, execute the installed application in response to a user input, and produce and display a graphic user interface that enables a consumer to control electric power consumption amount. Through such a webpage or the graphic user interface produced by the execution of the application, a consumer may be enabled to select a desired electric power consumption level in accordance with at least one embodiment.

As described, server 100 may be a computing system that is capable of communicating with other entities in the smart grid and/or coupled to communication network 200 and performing operations related to controlling electric power consumption and electric power supply. In order to perform such operation, server 100 may include communication circuit 110 including a receiver and a transmitter, processor 120, and memory 130 in accordance with at least one embodiment.

Communication circuit 110 may receive information, data, and/or signals from and transmit information, data, and/or signal to other entities including meters 301 to 303 and user equipment 600 of an associated consumer. Communication circuit 110 may include at least one module for communicating with other entities in a smart grid. For example, communication circuit 110 may include any or all of a broadcasting signal receiving module, a mobile communication module, a wireless internet module, a short-distance communication module, and a location information module (e.g., GPS receiving module). The short-distance communication module may include a Bluetooth circuit, a radio frequency identification (RFID) circuit, an infrared data association (IrDA) circuit, an ultra-wideband (UWB) circuit, a Zigbee circuit, and a near field communication (NFC) module circuit. In particular, communication circuit 110 may include a transmitter and a receiver.

Communication circuit 110 may receive, through communication network 200, signals from a plurality of meters (e.g., electricity meters 301 to 303) of consumers, power generation station 500, and transmission towers 401 and 402 through communication network 200, but the present invention is not limited thereto. Communication circuit 110 may receive such signals from predetermined entities of an existing smart grid, for example, from a management server of the smart grid. The received signals may include information on an electric power consumption amount, an electric power supply amount, and/or an electric power generation amount, which are measured at a corresponding device at a consumer side or at a supplier side.

For example, such a signal may be transmitted from meters 301 to 303 at a regular interval or upon generation of a predetermined event. Meters 301 to 303 may be registered at server 100, measure an electric power consumption amount of corresponding consumers, generate signals including information on the measured electric power consumption amount, and transmit the generated signals to server 100 through communication network 200. Such operation (e.g., collecting and transmitting data) may be performed at a predetermined interval or upon generation of a predetermined event. The predetermined interval may be about ten minutes and/or real time, but the present invention is not limited thereto. The predetermined event may be a signal for initiating the operation from server 100.

Communication circuit 110 may transmit a control signal to meters 301 to 303 in order to control an electric power supply amount of a corresponding consumer. For example, communication circuit 110 receives a control signal generated by processor 120 and including information on current values of a predetermined time period for controlling an electric power supply amount for a predetermined time period. Communication circuit 110 transmits such a control signal to meters 301 and 303 through communication network 200.

Processor 120 may control associated constituent elements and other entities (e.g., meters 301 to 303) coupled through communication network 200. For example, processor 120 may be a central control unit (CPU) of server 100. Processor 120 may control constituent elements of server 100 for adaptably and dynamically controlling and managing electric power consumption and electric power supply in accordance with at least one embodiment.

In particular, processor 120 may perform i) an operation for extracting, from the received signal, information on an electric power consumption amount of a corresponding consumer and ii) an operation for storing the extracted information on the electric power consumption amount in memory 130 in connection with an associated consumer. Such extracted electric power consumption amount may be stored with previously extracted information (e.g., previous electric power consumption amount) of the same consumer. That is, electric power consumption amounts measured for a predetermined time period (e.g., one day, one week, or one year) may be stored in connection with a corresponding consumer. The stored electric power consumption amounts may vary according to a time of collecting information or a time of measuring the electric power consumption amount.

Processor 120 may perform iii) an operation for analyzing the extracted electric power consumption amount with previously electric power consumption amounts extracted from previously received signals and stored in memory 130. Processor 120 may perform iv) an operation for generating an electric power consumption pattern of the corresponding consumer based on the analysis result.

Figure 2:
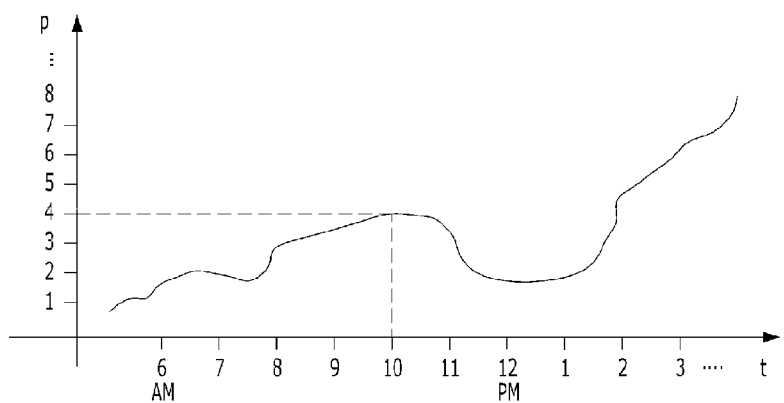
FIG. 2 illustrates an electric power consumption pattern in accordance with at least one embodiment.

The electric power consumption pattern of a consumer may be a customer base line (CBL). The CBL may be a graph formed of an average electric power consumption amount of each time unit (e.g., every hour, every 30 minutes) for a predetermined time period (e.g., a day), as shown in FIG. 2. Such an electric power consumption pattern will be described in more detail with reference to FIG. 2.

Processor 120 may perform v) an operation for deciding an electric power supply amount of each consumer based on the determined electric power consumption pattern and calculate a current value based on the decided electric power supply amount.

For example, such an electric power supply amount may be obtained based on an electric power supply level and/or a desired electric power consumption level in accordance with at least one embodiment. The electric power supply level may be determined based on an overall electric power supply amount and an overall electric power consumption amount. Such operation will be described in detail with reference to FIG. 3 and FIG. 4.

When an overall electric power generation amount is not enough for an overall electric power consumption amount or when an overall electric power generation amount is about the overall electric power consumption amount, server 100 identifies such electric supply states as a first supply level and a second supply level, respectively. When an overall electric power generation amount is enough for an overall electric power consumption amount, processor 120 may perform an operation for identifying such an electric supply state as a third supply level.

Upon the determination of the electric power supply level, processor 120 may perform an operation for selecting an electric power supply coefficient corresponding to the electric power supply level, generating an electric power supply pattern for a corresponding consumer for a predetermined time period based on the selected power supply coefficient by reflecting the selected power supply coefficient on the electric power consumption pattern, and calculating current values based on the calculated electric power supply pattern.

In addition, a consumer may be enabled to select a desired electric power consumption level through user equipment 600 in accordance with at least one embodiment. Based on the selected desired electric power consumption level, processor 120 may perform an operation for selecting an electric power consumption coefficient corresponding to the desired electric power consumption level, for calculating an electric power supply amount by reflecting the selected electric power consumption coefficient on the electric power consumption pattern of the corresponding consumer, and for calculating current values for a predetermined time period based on the calculated electric power supply amount. Processor 120 may transmit the calculated current values for a predetermined time period to transmitter 130 in order to control electric power consumption of a consumer.

Memory 130 may store various information, for example, an operating system for controlling constituent elements, a designated application for enabling a consumer to select a desired electric power consumption level, and information necessary for providing controlling and managing electric power consumption and supply.

As described, server 100 may determine an electric power consumption pattern of a consumer based on electric power consumption amounts collected from a meter of the corresponding consumer. Such operation will be described in detail with reference to FIG. 2.

FIG. 2 illustrates an electric power consumption pattern in accordance with at least one embodiment.

Referring to FIG. 2, an electric power consumption pattern of a consumer may be determined by observing electric power consumption amounts or electricity consumption variations of each consumer (e.g., each residence unit) for a predetermined time period, such as a hour, a date, a day of a week, and a season and determine a pattern of increments and/or decrements in electric power consumption based on the analysis result. The electric power consumption pattern may be a customer baseline load (CBL) for a predetermined time period. That is, the electric power consumption pattern is set of average electric power consumption amounts of each time unit for the predetermined time period.

For example, server 100 may collect information on electric power consumption amounts of consumers at regular interval (e.g., ten min or one hour) for a predetermined time period (e.g., a day, a week, a month), calculate an average electric power consumption amount at each time unit for a predetermined time period based on the collected information, and store the calculated average electric power consumption amounts as an electric power consumption pattern (e.g., CBL) of each consumer, such as a 10-day baseline, a 8-day baseline, a 5-day baseline, and so forth.

In FIG. 2, a one-day CBL is illustrated as an example of the electric power consumption pattern, but the present invention is not limited thereto. As shown, the one-day CBL includes an x-axis denoting average electric power consumption amounts and a y-axis denoting time units (e.g., one hour, ten min, fifteen min). For example, an electric power consumption amount at 10:00 AM is about 10 kw.

Such an electric power consumption pattern may denote average electric power consumption of a corresponding consumer. In accordance with at least one embodiment, the electric power consumption pattern may be used to individually, adaptably, and dynamically control electric power consumption or electric power supply of a corresponding consumer.

In accordance with at least one embodiment, an overall electric power supply state may be considered to control electric power supply amount in accordance with at least one embodiment. That is, an electric power supply level may be determined based on an overall electric power supply amount and an overall electric power consumption amount. Such an electric power supply level will be described with reference to FIG. 3.

Figure 3:
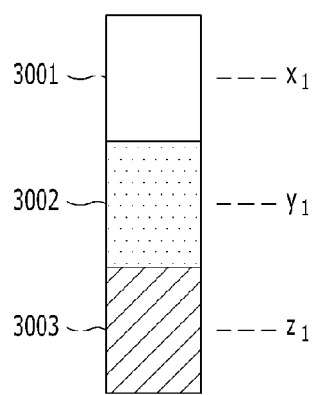
FIG. 3 illustrates an electric power supply level in accordance with at least one embodiment.

FIG. 3 illustrates an electric power supply level in accordance with at least one embodiment.

Referring to FIG. 3, processor 120 of server 100 may determine an electric power supply level based on an overall electric power supply amount and an overall electric power consumption amount. That is, the overall electric power supply amount and the overall electric power consumption amount may be determined based on signals received from meters 301 to 303 of consumers, power generation station 500, and transmission towers 401 and 402.

For example, processor 120 of server 100 may select one of first electric power supply level 3001, second electric power supply level 3002, and third electric power supply level 3003 based on the overall electric power supply state determined based on the overall electric power supply amount and the overall electric power consumption amount. In particular, server 100 determines first electric power supply level 3001 as the electric power supply level when the overall electric power supply amount is about a first amount greater than the overall electric power consumption amount. Server 100 determines second electric power supply level 3002 as the electric power supply level when the overall electric power supply amount is about a second amount greater than the overall electric power consumption amount. Server 100 determines third electric power supply level 3003 as the electric power supply level when the overall electric power supply amount is about a third amount greater than the overall electric power consumption amount. The first amount is greater than the second amount and the second amount is greater than the first amount.

Server 100 may select one of electric power supply coefficients (x1, y1, z1) mapped to the determined electric power supply level. Such electric power supply levels 3001, 3002, and 3003 and electric power supply coefficients x1, y1, and z1 may be set by at least one of a system designer, an operator, a service provider, a consumer, and so forth. Such a selected electric power supply coefficient may be reflected to the electric power supply pattern to determine an electric power supply amount of a corresponding consumer.

The electric power supply levels were described as three electric power supply levels, but the present invention is not limited thereto. More than three electric power supply levels may be defined based on various factors such as a difference between an overall power electric consumption amount and an overall power electric supply amount. That is, five electric power supply levels may be defined when difference between the overall power electric supply amount and the overall power electric consumption amount is greater than a predetermined amount.

The electric power supply coefficient may be defined by at least one of a system designer, a user, a service provider, a consumer, and an operator. Furthermore, the electric power supply coefficient may be an integer number defined by at least one of a system designer, a user, a service provider, a consumer, and an operator.

In addition to the electric power supply level, a desired electric power consumption level may be selected by a consumer and considered to determine an electric power supply amount of a consumer in accordance with at least one embodiment. Hereinafter, such a desired electric power consumption level will be described in reference to FIG. 4.

Figure 4:
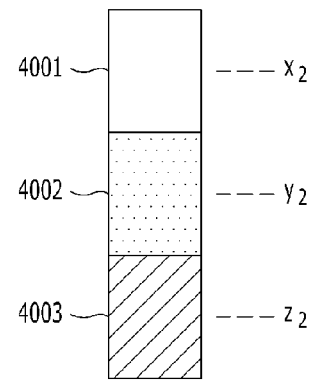
FIG. 4 illustrates a desired electric power consumption level selected by a consumer in accordance with at least one embodiment.

FIG. 4 illustrates a desired electric power consumption level selected by a consumer in accordance with at least one embodiment.

Referring to FIG. 4, server 100 may receive a desired electric power consumption level from a consumer. For example, a consumer may select a desired electric power consumption level through user equipment 600. In particular, user equipment 600 may download an application from server 100, install the downloaded application, execute the installed application upon the generation of a predetermined event, produce and display a graphic user interface as a result of executing the application. Such a graphic user interface may enable a consumer to select such a desired electric power consumption level. The desired electric power consumption level denotes an electric power consumption amount that a consumer wants to have. Alternatively, a consumer may be enabled to select a desired electric power consumption level through a web-page published on Internet by server 100.

For example, a consumer may select first electric power consumption level 4001 when the consumer wants to have an electric power supply amount a first amount greater than an average electric power consumption amount. A consumer may select second electric power consumption level 4002 when the consumer wants to have an electric power supply amount a second amount greater than an average electric power consumption amount. A consumer may select third electric power consumption level 4003 when the consumer wants to have an electric power supply amount a third amount greater than an average electric power consumption amount. The first amount is greater than the second amount, and the second amount is greater than the third amount.

Processor 120 of sever 100 may select one of electric power consumption coefficients x2, y2, and z2, which his mapped to the desired electric power consumption level selected by a consumer. Processor 120 may calculate an electric power supply amount of a corresponding consumer by reflecting the selected electric power consumption coefficient on the electric power consumption pattern.

The electric power consumption levels were described as three electric power consumption levels, but the present invention is not limited thereto. More than three electric power consumption levels may be defined based on various factors. That is, five electric power consumption levels may be defined.

The electric power consumption coefficient may be defined by at least one of a system designer, a user, a service provider, a consumer, and an operator. Furthermore, the electric power consumption coefficient may be an integer number defined by at least one of a system designer, a user, a service provider, a consumer, and an operator.

As described, server 100 may control an electric power supply amount of a consumer by restricting an electric power consumption amount based on an electric power consumption pattern and an overall electric power supply state. That is, server 100 may transmit the current value to a meter of a corresponding consumer and enable to the meter to control the electric power consumption amount of the corresponding consumer.

As described, server 100 calculates an electric power supply amount and a current value according to an electric power consumption pattern and controls an electric power consumption amount of a corresponding consumer in accordance with at least one embodiment. Such operation will be described in detail with reference to FIG. 5.

Figure 5:
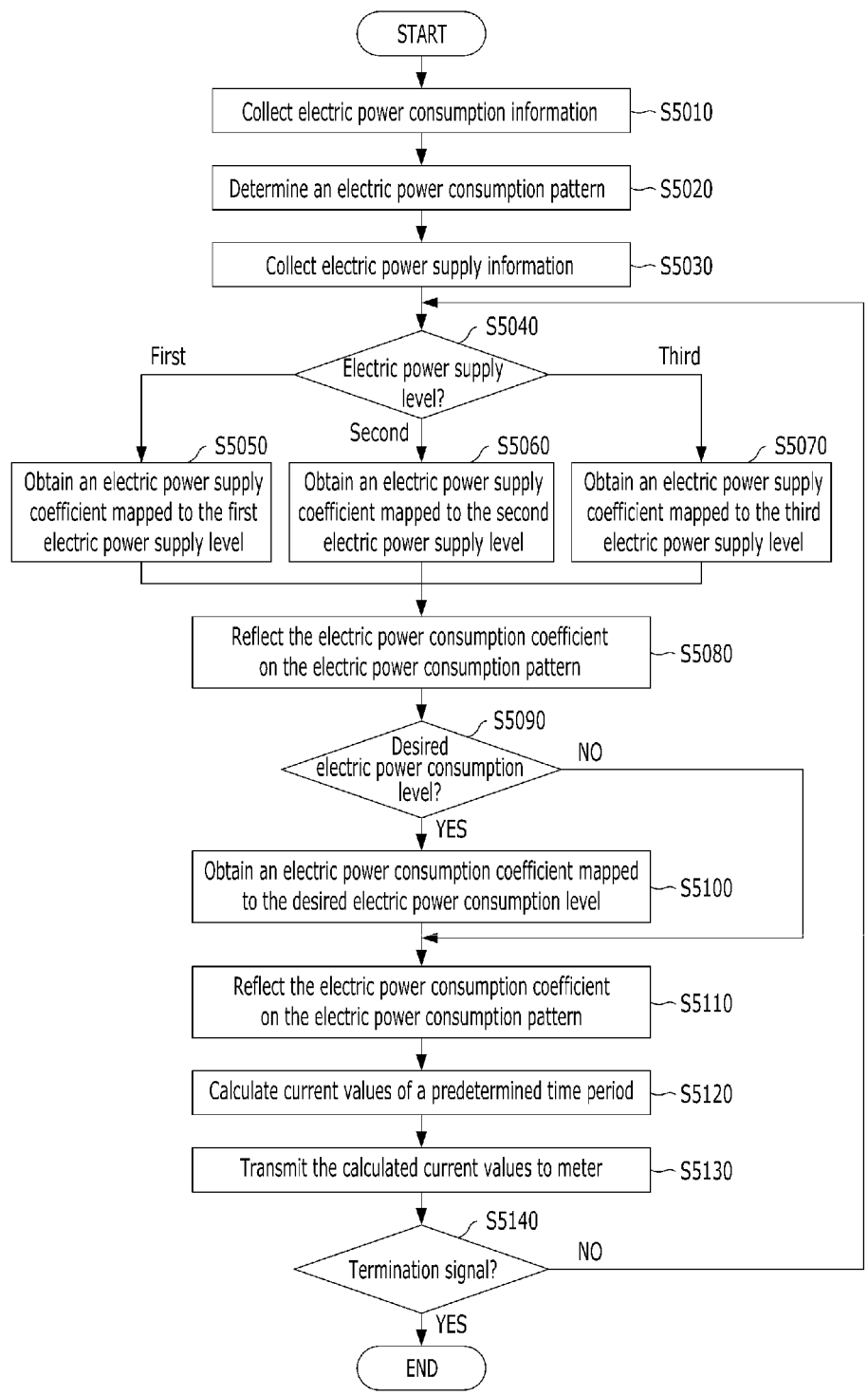
FIG. 5 illustrates managing electric power consumption of each customer in accordance with at least one embodiment.

FIG. 5 illustrates managing electric power consumption of each customer in accordance with at least one embodiment.

Referring to FIG. 5, information on an electric power consumption amount may be collected from each consumer at step S5010. For example, server 100 receives signals from meters 301 to 303 at a predetermined regular interval and extracts measurement of electric power consumption amounts, measured by meters 301 to 303, from the received signals. Server 100 stores the extracted electric power consumption amounts in connection with each consumer. That is, server 100 stores and manages the electric power consumption amounts of each consumer, measured continuously and consistently for a predetermined time period, such as one day, two days, six days, eighteen days, a month, and so forth.

At step S5020, an electric power consumption pattern of a consumer may be determined. For example, server 100 calculates an average electric power consumption amount of each time unit such as every ten minutes, one hour, or three hours. Based on the calculated average electric power consumption amount, server 100 determines the electric power consumption pattern of the consumer. In particular, server 100 generates a customer baseline load (CBL) for one day, as shown in FIG. 2 and uses the generated CBL as the electric power consumption pattern. Based on such a CBL, server 100 may determine an expected electric power consumption amount of a predetermined time. According to FIG. 2, server 100 estimates about 10 kw as the expected electric power consumption amount at 10:00 AM.

At step S5030, electric power supply information may be collected. For example, server 100 may receive signals from power generation station 500 and transmission tower 400 and determine an overall electric power supply amount based on information included in the received signals and an overall electric power consumption amount.

At step S5040, an electric power supply level may be determined. For example, server 100 may determine an electric power supply level based on the overall electric power supply amount and the overall electric power consumption amount.

In particular, server 100 determines a first electric power supply level as the electric power supply level when the overall electric power supply amount is about a first amount greater than the overall electric power consumption amount. Server 100 determines a second electric power supply level as the electric power supply level when the overall electric power supply amount is about a second amount greater than the overall electric power consumption amount. Server 100 determines a third electric power supply level as the electric power supply level when the overall electric power supply amount is about a third amount greater than the overall electric power consumption amount. The first amount is greater than the second amount and the second amount is greater than the first amount. Such first, second, and third electric supply level may be shown in FIG. 3.

When the electric power supply level is the first electric power supply level (First level—S5040), a coefficient x1 may be obtained at step S5050. For example, server 100 fetches the coefficient x1 mapped to the determined first electric power supply level from memory 130.

When the electric power supply level is the second electric power supply level (Second level—S5040), a coefficient y1 may be obtained at step S5060. For example, server 100 fetches the coefficient y1 mapped to the determined second electric power supply level from memory 130.

When the electric power supply level is the third electric power supply level (Third level—S5040), a coefficient z1 may be obtained at step S5070. For example, server 100 fetches the coefficient z1 mapped to the determined third electric power supply level from memory 130.

As described, the electric power supply level is divided into three levels and the three coefficients are respectively mapped thereto. However, the present invention is not limited thereto. For example, the electric power supply level may be divided into more than five levels and a coefficient may be mapped to each level.

Furthermore, the electric power supply level was described as being determined based on the overall electric power supply amount and the overall electric power consumption amount, but the present invention is not limited thereto. For example, various factors may be considered to determine an electric power supply level. The factors may include the number of available power generation stations, the number of malfunctioned power generation stations, weather, season or month of a year, national event (e.g., national holiday, Olympic, war), and so forth. A predetermined weight may be assigned to each factor. The weights of factors applicable to an electric power supply state may be added to determine an electric power supply level.

At step S5080, the electric power consumption pattern of a corresponding customer may be reflected with the selected coefficient. For example, the coefficient selected based on the electric power supply level may be multiplied to the CBL of the corresponding customer.

At step S5090, determination may be made so as whether a consumer requests a desired electric power consumption level. For example, a consumer may request a desired electric power consumption level. Such request may be made through user equipment 600 of the consumer. In particular, a consumer may download a predetermined application from server 100 to user equipment 600. User equipment 600 may install the downloaded application and execute the installed application in response to a user input from a consumer. As a result of execution of the application, a graphic user interface may be produced and displayed on user equipment 600. Such a graphic user interface may enable a consumer to select a desired electric power consumption level.

However, the present invention is not limited thereto. User equipment 600 accesses server 100 through a web-page published on Internet by server 100. Such a web-page may enable a consumer of user equipment 600 to select a desired electric power consumption level.

For example, a consumer may select one from three electric power consumption levels as shown in FIG. 4. A consumer may select a first electric power consumption level when the consumer wants to have an electric power supply amount a first amount greater than an average electric power consumption amount. A consumer may select a second electric power consumption level when the consumer wants to have an electric power supply amount a second amount greater than an average electric power consumption amount. A consumer may select a third electric power consumption level when the consumer wants to have an electric power supply amount a third amount greater than an average electric power consumption amount. The first amount is greater than the second amount, and the second amount is greater than the third amount.

When the consumer requests the desired electric power consumption level (Yes-S5090), a coefficient mapped to the desired electric power consumption level may be determined at step S5100. For example, server 100 determines a coefficient mapped to the desired electric power consumption level stored in memory 130. Such a coefficient may be predetermined and stored in memory 130 in connection with the power consumption levels. Such determination may be made at least one of a consumer, a system designer, an operation, and a service provider, but the present invention is not limited thereto.

As shown in FIG. 4, when a consumer selects the first electric power consumption level, server 100 fetches a first coefficient x2 mapped to the first electric power consumption level from memory 120. When a consumer selects the second electric power consumption level, server 100 fetches a second coefficient y2 mapped to the second electric power consumption level from memory 120. When a consumer selects the third electric power consumption level, server 100 fetches a third coefficient z2 mapped to the third electric power consumption level from memory 120.

At step S5110, the electric power consumption pattern of a corresponding customer may be reflected with the selected coefficient. For example, the coefficient selected based on the electric power supply level may be multiplied to the CBL of the corresponding customer.

As described, the electric power consumption pattern of a corresponding consumer was described as being reflected with the supply coefficient of the electric power supply level or the consumption coefficient of the electric power consumption level, but the present invention is not limited thereto. For example, only one of the supply coefficient and the consumption coefficient may be reflected to the electric power consumption pattern of the corresponding consumer. In case of applying only the supply coefficient, the operation steps S5090 to S5011 may be omitted. Alternatively, in case of applying one the consumption coefficient, the operation steps S5040 to S5080 may be omitted.

At step S5120, current values of a predetermined time period may be calculated. For example, server 100 calculates current values of a predetermined time period (e.g., one day, one week, one month, or one year) using the electric power consumption pattern of a corresponding consumer after reflecting at least one of the supply coefficient and the consumption coefficient to the electric power consumption pattern. In particular, i) server 100 identifies the predetermined time period for dynamically and adaptably controlling the electric power supply amount, ii) determine electric power supply amounts mapped to time units in the identified time period, and iii) calculate current values based on the determined electric power supply amounts.

At step S5130, the calculated current values may be transmitted to corresponding consumers. For example, server 100 transmits the calculated current values to meters 501 to 503 of consumers through communication network 200.

At step S5140, determination may be made so as whether the electric power management operation is terminated. For example, server 100 may determine at a predetermined interval whether a termination signal is received from at least one of user equipment of a consumer and an operator upon generation of a predetermined event. Such a determination operation may be performed at a predetermined interval.

When the termination signal is received (Yes-S5140), the management operation ends. When the termination signal is not received (No-S5140), an electric power supply level and a desired electric power consumption level may be determined based on the collected information at step S5040.

As described, an electric power consumption amount of a consumer may be adaptably controlled based on average electric power consumption amount of the corresponding consumer. That is, an electric power supply amount may be adaptively controlled based on the electric power consumption amount of the corresponding consumer in response to an overall electric power supply state of an electric power generation station and/or a desired electric power supply level of a consumer.

Figure 6:
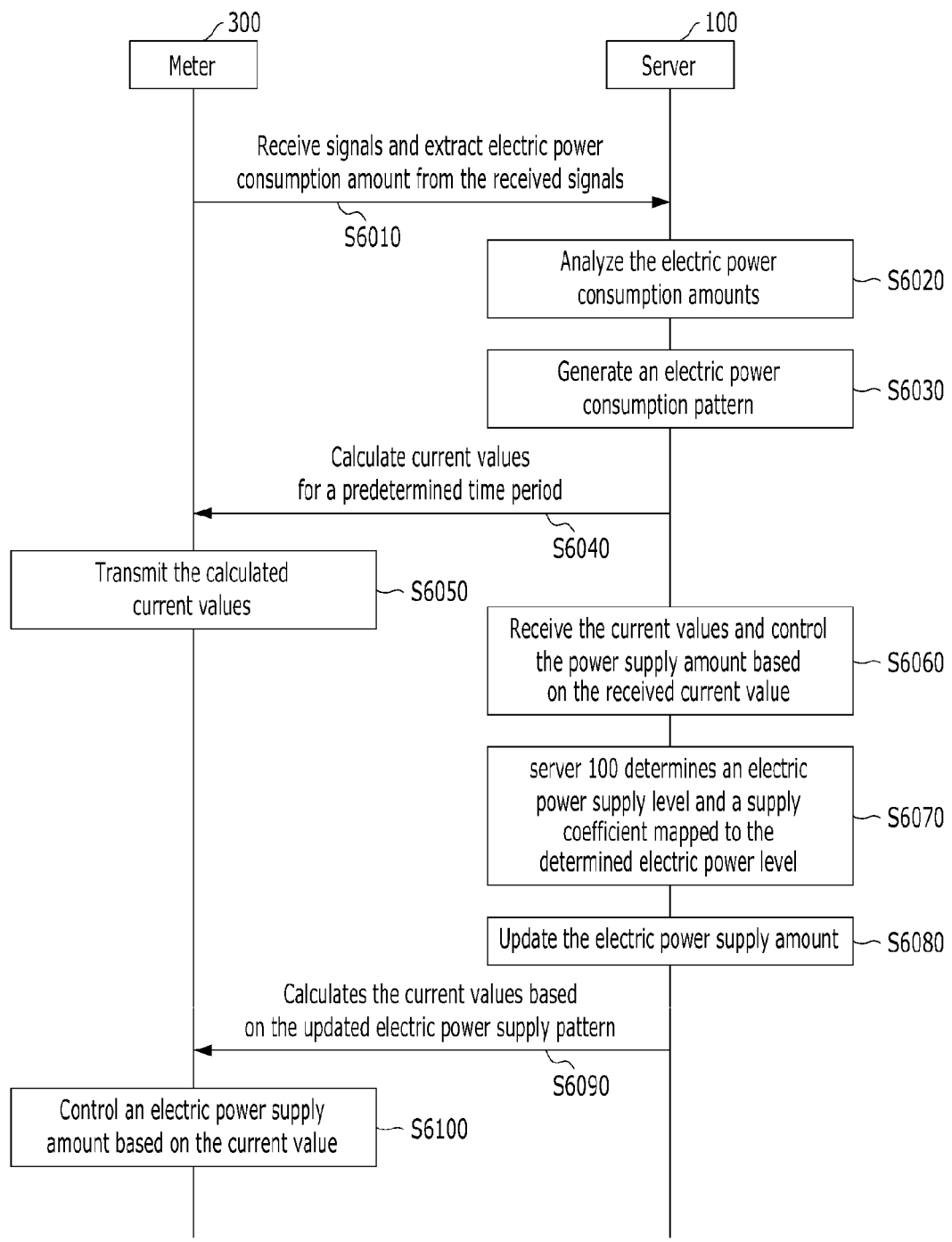
FIG. 6 illustrates a method of managing an electric power supply amount based on an overall electric supply amount in accordance with at least one embodiment.

Hereinafter, a method of managing an electric power supply amount based on an overall electric supply amount in accordance with at least one embodiment will be described with reference to FIG. 6. In particular, one example of managing an electric power supply amount is illustrated in FIG. 6. FIG. 6 illustrates a method of managing an electric power supply amount based on an overall electric supply amount in accordance with at least one embodiment.

Referring to FIG. 6, server 100 receives signals including information on an electric power consumption amount from meter 200 of a consumer at step S6010. Server 100 may extract the information on electric power consumption amount from the received signals and store the extracted information with previously stored electric power consumption amount of the consumer associated with meter 200 in connection to identification information of meter 200 in memory 120.

At step S6020, server 100 analyzes the electric power consumption amounts associated with meter 200, stores for a predetermined time period (e.g., one year), and calculates average electric power consumption amounts of each time unit for the predetermined time period.

At step S6030, server 100 generates an electric power consumption pattern of the corresponding consumer based on the calculated average electric power consumption amounts. For example, server 100 may generate a customer baseline load (CBL) of a predetermined time period based on the generated average electric power consumption amounts. At step S6040, server 100 calculates current values for a predetermined time period based on the electric power consumption pattern of the corresponding consumer. For example, At step S6050, server 100 transmits the calculated current values to meter 200. At step S6060, meter 200 receives the current values and controls the power supply amount based on the received current value. At step S6070, server 100 determines an electric power supply level and a supply coefficient mapped to the determined electric power level.

At step S6080, server 100 updates the electric power supply pattern by reflecting the determined supply coefficient to the electric power consumption pattern of the corresponding consumer. At step S6090, server 100 calculates the current values based on the updated electric power supply pattern. At step S6100, server 100 transmits the calculated current values to meter 300 through communication network 200. At step S6110, meter 300 controls an electric power supply amount based on the current value received from server 100.

Figure 7:
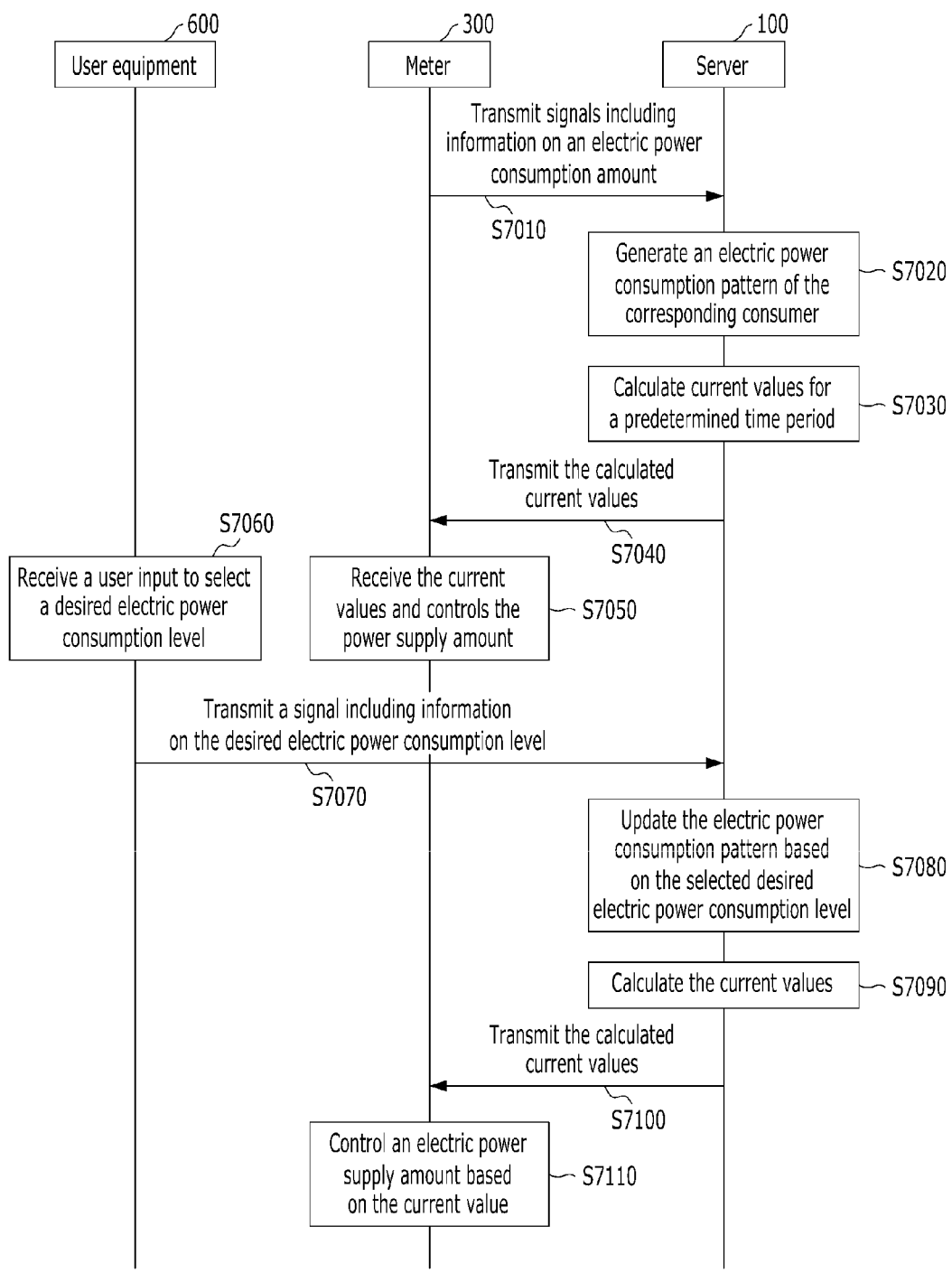
FIG. 7 illustrates a method of managing an electric power supply amount based on a desired electric supply amount of a consumer in accordance with at least one embodiment.

Hereinafter, a method of managing an electric power supply amount based on a desired electric supply amount of a consumer in accordance with at least one embodiment will be described with reference to FIG. 7. In particular, another example of managing an electric power supply amount is illustrated in FIG. 7. FIG. 7 illustrates a method of managing an electric power supply amount based on a desired electric supply amount of a consumer in accordance with at least one embodiment.

Referring to FIG. 7, server 100 receives signals including information on an electric power consumption amount from meter 300 of a consumer at step S7010. Server 100 may extract the information on electric power consumption amount from the received signals and store the extracted information with previously stored electric power consumption amount of the consumer associated with meter 300 in connection to identification information of meter 300 in memory 120.

At step S7020, server 100 analyzes the electric power consumption amounts associated with meter 300, stores for a predetermined time period (e.g., one year), and calculates average electric power consumption amounts of each time unit for the predetermined time period.

At step S7030, server 100 generates an electric power consumption pattern of the corresponding consumer based on the calculated average electric power consumption amounts. For example, server 100 may generate a customer baseline load (CBL) of a predetermined time period based on the generated average electric power consumption amounts.

At step S7040, server 100 calculates current values for a predetermined time period based on the electric power consumption pattern of the corresponding consumer. At step S7050, server 100 transmits the calculated current values to meter 300. At step S7060, meter 200 receives the current values and controls the power supply amount based on the received current value.

At step S7070, user equipment 600 receives a user input to select a desired electric power consumption level. At step 7080, user equipment 600 transmits a signal including information on the desired electric power consumption level to server 100.

At step S7090, server 100 receives the signal from user equipment 600 and determines the selected desired electric power consumption level based on information included in the received signal. At step S7100, server 100 determines a consumption coefficient mapped to the determined electric power level.

At step S7110, server 100 updates the electric power consumption pattern of the corresponding consumer by reflecting the determined consumption coefficient to the electric power consumption pattern of the corresponding consumer. At step S7120, server 100 calculates the current values based on the updated electric power consumption pattern. At step S7130, server 100 transmits the calculated current values to meter 300 through communication network 200. At step S7140, meter 300 controls an electric power supply amount based on the current value received from server 100.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A server, coupled to a smart grid, for managing and controlling an amount of electric power consumed by a customer, the server comprising:
  a communication circuit receiving information on the amount of electric power consumption from a meter through a communication network and to transmit a control signal to the meter through the communication network for controlling the amount of electric power consumed by the customer; and
  a processor determining an electric power consumption pattern of the customer based on the information on the amount of electric power consumed, and calculating an amount of electric power supplied for a predetermined time period based on the determined electric power consumption pattern of the consumer, wherein the calculating the amount of electric power supplied includes:
  determining an electric power supply level based on an overall electric power supply state, wherein the determining of the electric power consumption pattern of the customer includes calculating an average amount of electric power consumed at each unit time based on the information on the amount of electric power consumed included in the received information;
  generating the electric power consumption pattern by combining the calculated average amount of electric power consumed;
  selecting one of predetermined electric power supply coefficients mapped to the determined electric power supply level and multiplying the electric power consumption pattern of the customer with the selected electric power supply coefficient; and
  transmitting a control signal to the meter through the communication circuit for controlling the electric power consumption of the customer based on the calculated electric power supplied.

2. The server of claim 1, wherein the processor:
  calculates current values for the predetermined time period based on the calculated amount of electric power supplied; and
  generates the control signal including information on the calculated current values.

3. The server of claim 1, wherein:
  the processor extracts the amount of electric power consumed at a predetermined unit time from the received information; and
  the server further comprises a memory configured to store the extracted amount of electric power consumed information in connection with identification information of the consumer.

4. The server of claim 1, wherein:
  the communication circuit receives information from at least one of electric power generation stations; meters of customer, and transmission towers;
  the processor measures an overall amount of electric power supplied and an overall amount of electric power consumed based on the received information, to compare the measured overall amount of electric power supplied and the measured overall amount of electric power consumed, and to determine the electric power supply level based on the comparison result.

5. The server of claim 1, wherein:
the communication circuit receives information on a desired electric power consumption level from user equipment of the customer.

6. A method of managing and controlling an amount of electric power consumed by a customer, the method comprising:
receiving, by a server, information on the amount of electric power consumed by the customer from a meter through a communication network;
determining an electric power consumption pattern based on the information of the amount of electric power consumed by the customer, wherein the determining of the electric power consumption pattern of the customer includes calculating an average amount of electric power consumed at each unit time based on the information on the amount of electric power consumed included in the received information, and
generating the electric power consumption pattern by combining the calculated average amount of electric power consumed;
calculating an amount of electric power supplied for a predetermined time period based on the determined electric power consumption pattern, wherein the calculating the amount of electric power supplied includes determining an electric power supply level based on an overall electric power supply state;
selecting one of predetermined electric power supply coefficients mapped to the determined electric power supply level and multiplying the electric power consumption pattern of the customer with the selected electric power supply coefficient; and
transmitting a control signal to the meter through the communication network for controlling the electric power consumption of the customer based on the calculated electric power supplied.

7. The method of claim 6, wherein the calculating the amount of electric power supplied comprises:
calculating current values for the predetermined time period based on the calculated amount of electric power supplied; and
generating the control signal including information on the calculated current values.

8. The method of claim 7, comprising:
controlling, by the meter, the amount of electric power consumed at the predetermined time unit based on at least one of the calculated current values, mapped to the predetermined time unit.

9. The method of claim 6, wherein the receiving information on the amount of electric power consumption from the meter comprises:
measuring, by the meter, the amount of electric power consumed at a regular interval;
generating, by the meter, the information on the measured amount of electric power consumed; and
transmitting, by the meter, the generated information to the server.

10. The method of claim 6, wherein the receiving information comprises:
extracting the amount of electric power consumed at the predetermined time from the received information; and
storing the extracted amount of electric power consumption information in a memory of the server in connection with identification information of the customer.

11. The method of claim 6, wherein the determining the electric power supply level comprises:
receiving information from at least one of electric power generation stations, meters of customers, and transmission towers;
measuring an overall amount of electric power supplied and an overall electric power consumed based on the received information;
comparing the measured overall amount of electric power supplied and the measured overall electric power consumed; and
determining the electric power supply level based on the comparison result.

12. The method of claim 6, wherein the calculating the amount of electric power supplied comprises:
receiving information on a desired electric power consumption level from user equipment of the customer.

13. The method of claim 12, wherein the receiving the information on the electric power consumption level comprises:
providing a user interface to the user equipment for enabling the customer to enter the desired electric power consumption level.

14. The method of claim 6, wherein the electric power consumption pattern is a customer baseline load.

* * * * *